(12) United States Patent
Niebling et al.

(10) Patent No.: US 9,757,929 B2
(45) Date of Patent: Sep. 12, 2017

(54) METHOD AND DEVICE FOR TRANSFER LAMINATION

(71) Applicant: Karl Wörwag Lack-und Farbenfabrik GmbH & Co. KG, Stuttgart (DE)

(72) Inventors: Curt Niebling, Penzberg (DE); Christian Drexler, Garmisch-Partenkirchen (DE)

(73) Assignee: Karl Wörwag Lack-und Farbenfabrik GmbH & Co. KG (DE)

( * ) Notice: Subject to any disclaimer, the term of this patent is extended or adjusted under 35 U.S.C. 154(b) by 186 days.

(21) Appl. No.: 14/760,240

(22) PCT Filed: Jan. 9, 2014

(86) PCT No.: PCT/EP2014/000029
§ 371 (c)(1),
(2) Date: Jul. 10, 2015

(87) PCT Pub. No.: WO2014/108335
PCT Pub. Date: Jul. 17, 2014

(65) Prior Publication Data
US 2015/0352822 A1    Dec. 10, 2015

(30) Foreign Application Priority Data

Jan. 11, 2013 (DE) .......................... 10 2013 000 400

(51) Int. Cl.
| | | |
|---|---|---|
| B32B 37/00 | (2006.01) | |
| B32B 38/10 | (2006.01) | |
| B29C 63/16 | (2006.01) | |
| B44C 1/17 | (2006.01) | |

(52) U.S. Cl.
CPC ............ B32B 37/025 (2013.01); B29C 63/16 (2013.01); B32B 38/10 (2013.01); B44C 1/1712 (2013.01); *B32B 2305/72* (2013.01); *B32B 2309/02* (2013.01); *B32B 2309/12* (2013.01); *B32B 2377/00* (2013.01)

(58) Field of Classification Search
CPC ... B29C 63/16; B44C 1/1712; B32B 2305/72; B32B 2309/02; B32B 2309/12; B32B 2377/00; B32B 37/025; B32B 38/10
USPC .................................................. 156/237, 580
See application file for complete search history.

(56) References Cited

U.S. PATENT DOCUMENTS

| | | | | | |
|---|---|---|---|---|---|
| 1,909,631 | A | * | 5/1933 | Poschel | ................. B44C 1/1712 156/240 |
| 4,515,849 | A | * | 5/1985 | Keino | ................... B44C 1/1712 156/230 |
| 5,662,977 | A | * | 9/1997 | Spain | .................. B29C 37/0025 428/141 |
| 6,776,100 | B2 | | 8/2004 | Cutcher | |
| 7,588,812 | B1 | | 9/2009 | Patel et al. | |
| 2005/0126691 | A1 | * | 6/2005 | Sugino | .................. B44C 1/1712 156/230 |
| 2005/0221064 | A1 | * | 10/2005 | Glatz | .................... B44C 1/1712 428/195.1 |

FOREIGN PATENT DOCUMENTS

| | | | |
|---|---|---|---|
| CH | 431 335 A | 2/1967 | |
| DE | 34 22 965 C2 | 2/1987 | |
| DE | 199 20 577 C1 | 1/2001 | |
| DE | 101 54 732 A1 | 5/2003 | |
| DE | 103 15 582 A1 | 10/2004 | |
| DE | 103 18 542 A1 | 11/2004 | |
| DE | 10 2004 033 540 A1 | 1/2006 | |
| DE | 10 2007 040 376 A1 | 2/2009 | |
| DE | 10 2007 058 714 A1 | 6/2009 | |
| EP | 0 450 054 B1 | 10/1991 | |
| EP | 1 000 731 A1 | 5/2000 | |
| EP | 1 119 455 B1 | 3/2005 | |
| EP | 1 851 077 B1 | 11/2007 | |
| JP | 05162230 A * | 6/1993 | ........... B44C 1/1712 |
| WO | 97/46377 A1 | 12/1997 | |

* cited by examiner

*Primary Examiner* — Sonya Mazumdar
(74) *Attorney, Agent, or Firm* — DLA Piper LLP (US)

(57) ABSTRACT

A transfer laminate (35), comprising a carrier film having an adhering decorative element having a solid, pigmented, partially cured decorative layer, is laminated on the decoration side onto a substrate (40) having a temperature between 50 and 70° C. on the decoration side, on which substrate a coating that can be painted over has been applied in the course of a traditional process. The paint layer of the coating that was applied last is still moist and tacky after the intermediate drying thereof. The transfer laminate (35) is laminated onto the still moist and tacky paint layer on the substrate (40), and at least the region of the transfer laminate (35) containing the decorative element is pressed onto the substrate coating over the entire area at a pressure of 0.2 to 5.0 bar for 40 to 240 seconds. Then the carrier film is quickly cooled to a temperature less than 20° C. and then removed from the substrate coating, wherein the decorative element remains on the substrate coating. The device for transfer lamination forms an applicator (10), which comprises: two flexible membranes (20, 22), which are both clamped pressure-tight on a common frame (12) along the perimeter of the membranes in such a way that an intermediate space is created therebetween, in which a flexible warm—or hot-water layer (27) can be enclosed; a chamber (30), which can be filled with compressed air, wherein overall such an arrangement is created that a gradual introduction of compressed air into the chamber (30) moves the two flexible membranes (20, 22) and the flexible warm—or hot-water layer (27) jointly in the manner of a balloon onto the substrate surface (42) to be coated in order to apply the transfer laminate (35) to and press the transfer laminate onto said substrate surface (42) without bubbles.

10 Claims, 3 Drawing Sheets

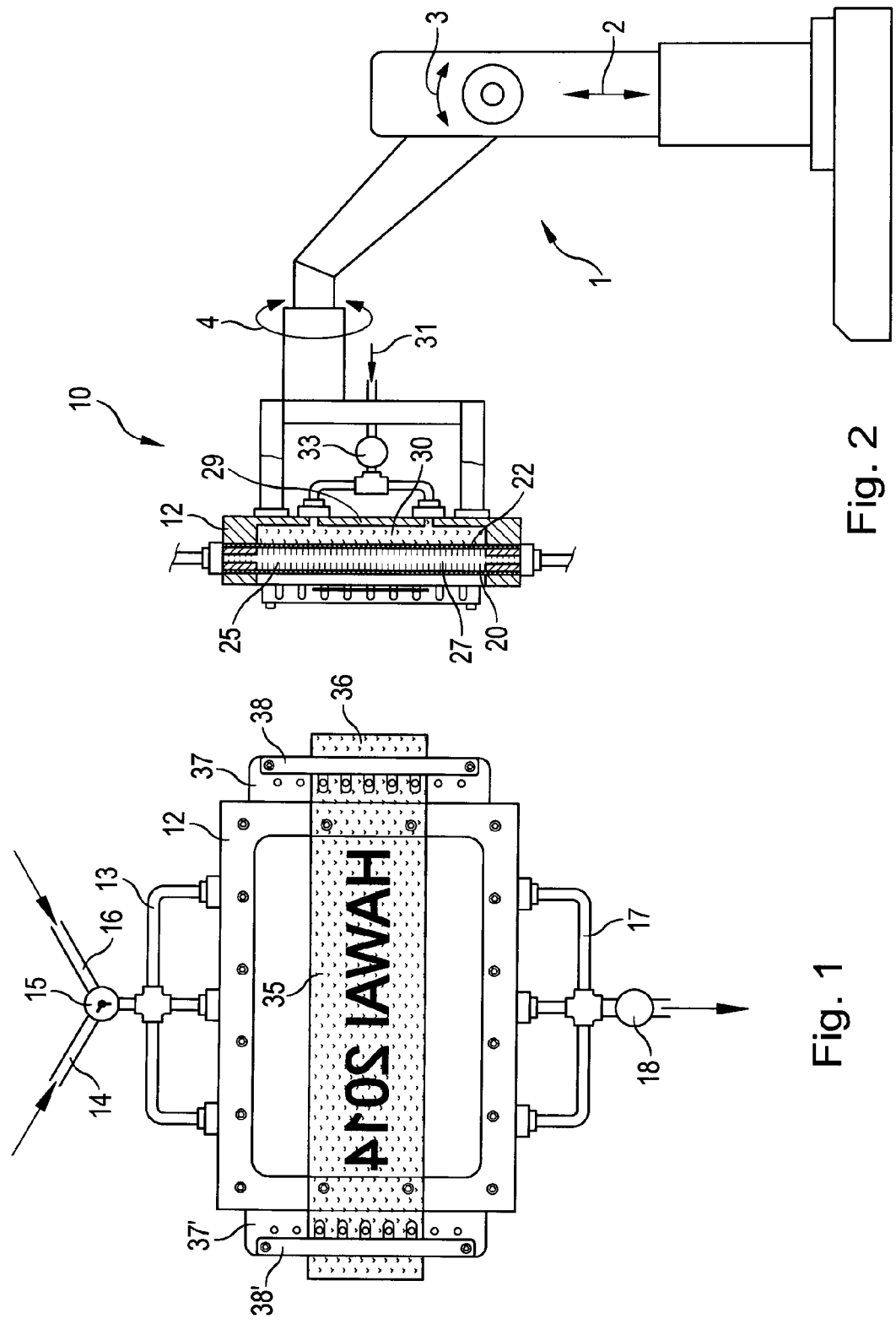

Figure 5:
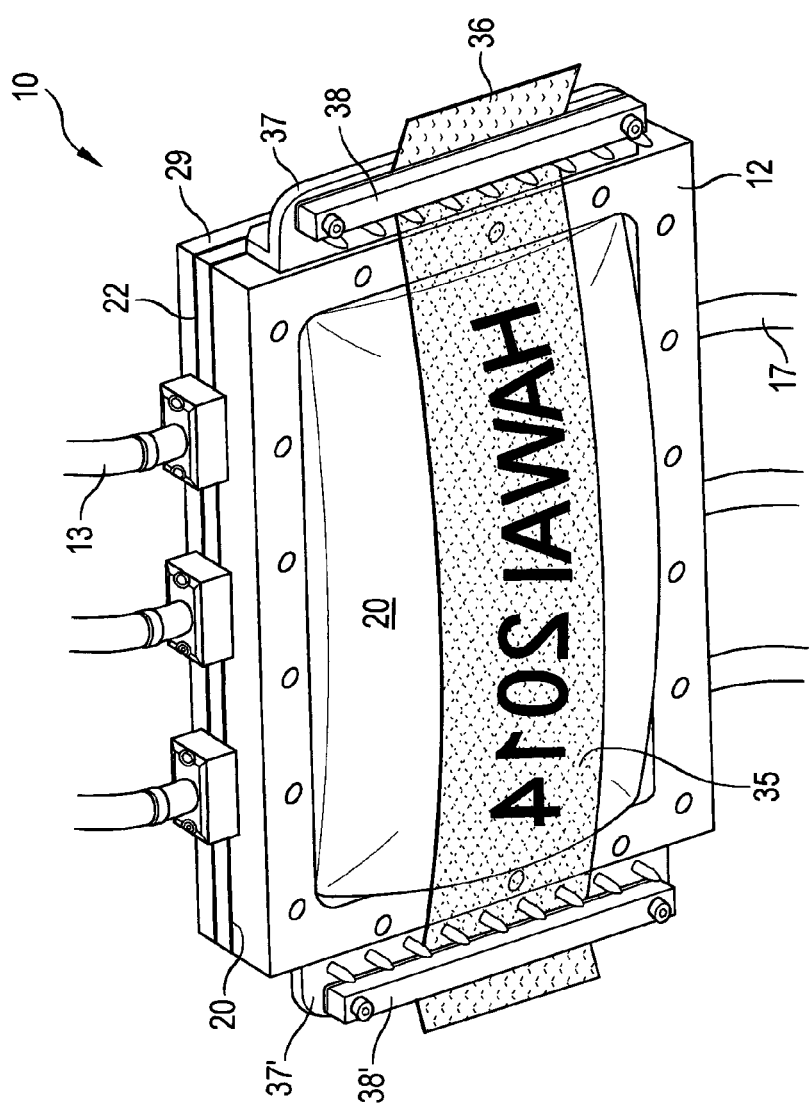

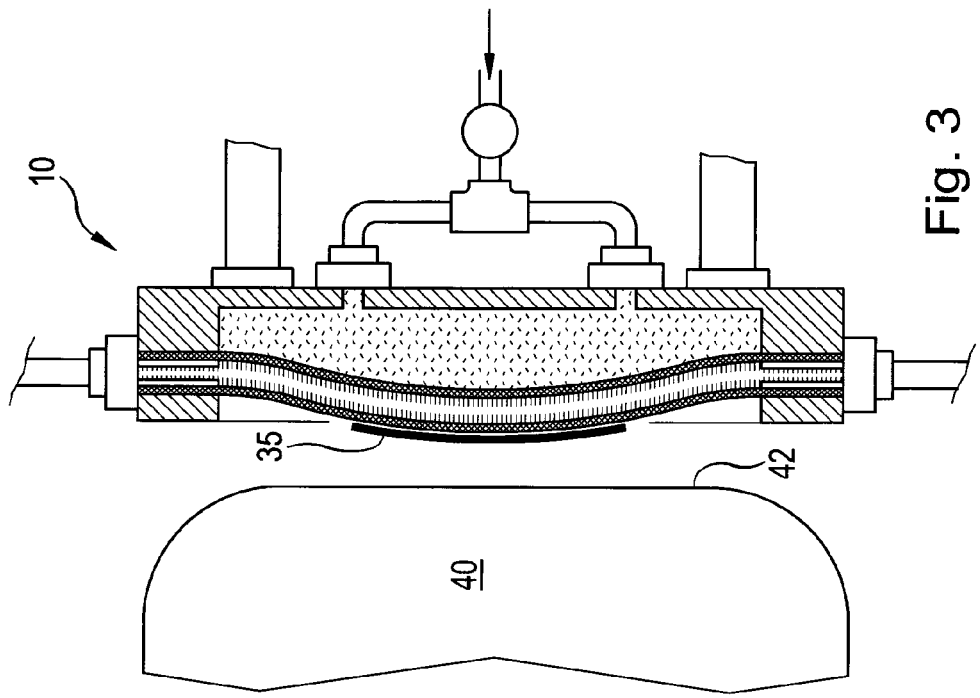
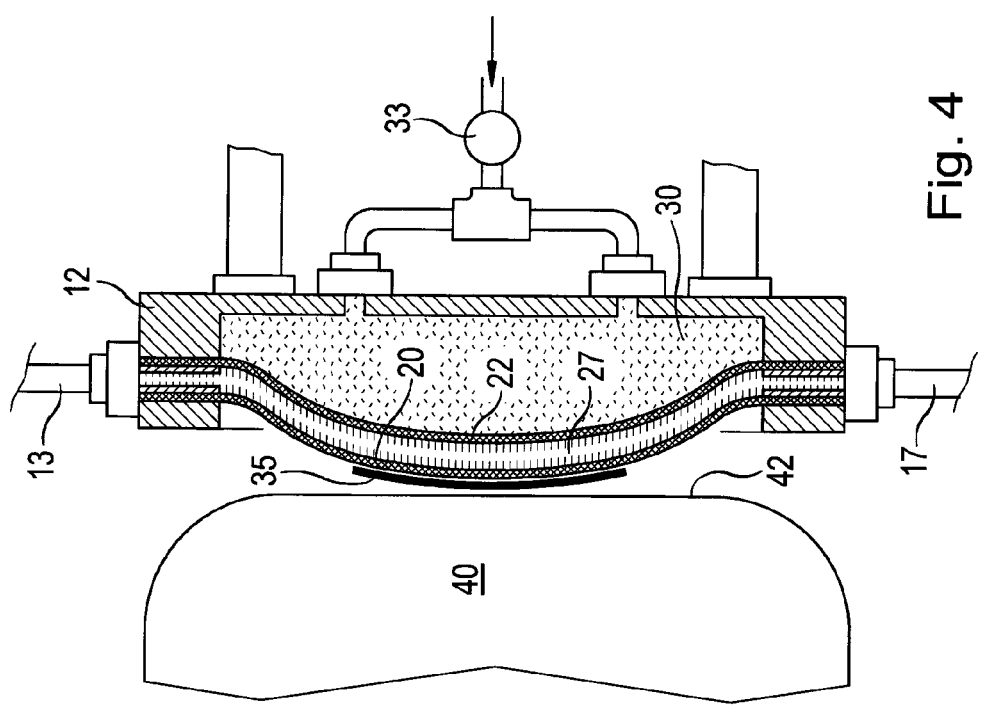

METHOD AND DEVICE FOR TRANSFER LAMINATION

TECHNICAL FIELD

The present invention relates to a method for transfer lamination in which a transfer laminate, comprising a backing foil with an adhering decorative element having a solid, pigmented, and partially cured decorative layer is laminated by its decoration side onto a substrate, and finally the backing foil is peeled off and removed.

A method of this kind may be integrated in a conventional painting operation, so that the transfer laminate is laminated onto an overpaintable coating, as for example onto a freshly produced, color-imparting basecoat film, on the substrate. The intention is to provide painted substrates, such as painted bodywork parts of a motor vehicle, for example, that are provided with a perfect paint coat, the decorative element being perceived as an integral constituent of said paint coat.

Further provided with the invention is a device for implementing a method of this kind for transfer lamination.

Lastly, the invention encompasses the painted products obtainable according to the method of the invention for transfer lamination, these products having a perfect paint film on which an additional decorative element is perceived as an integral constituent of said paint film.

PRIOR ART

Document EP 0 450 054 B1 relates to a method for producing embossed-surface polymeric sheets envisaged for outdoor use. For the production, a transfer laminate is provided that has a release layer and, thereon, one or more decorative layers on a flexible backing, as for example a polyester foil or a polypropylene foil. This transfer laminate is placed by the decorative layer onto a freshly extruded strip (strip thickness 0.262 to 2.032 mm) of impact-modified PVC resin at the extrusion temperature of 196 to 204° C. and is pressed on using rolls. This is followed by cooling, using water-cooled chill rolls, to a temperature of 146 to 171° C., after which the backing is peeled off; a preferred peeling temperature is 153° C., and this cooling permits the free removal of the backing from the laminate.

Document WO 97/46377 A1 discloses a corresponding method whereby interior parts for motor vehicles, having a decorative and structured surface layer of plastic, are produced by transfer lamination under the same conditions. The transfer laminate may comprise a polypropylene foil, with a clearcoat film and, over it, a colored decorative layer having been applied to said foil.

Document DE 34 22 965 C2 relates to a method for producing laminated sheets or laminated foils provided with surface protection. Applied to a backing material, such as to a polymeric foil, for example, is a transfer paint which is at least partly cured. Depending on the particular case, transparent or colored paint systems may be used. The resulting laminate, composed of backing foil and colored transfer paint, is compressed together with a base ply of the laminated sheet in a suitable press, the temperature generally employed being between 130 and 170° C. and the pressure generally employed being more than 40 bar, more particularly around 100 bar. After the compressed product has been cooled, the backing foil is peeled from the sheet, and the cured transfer paint remains on the surface of the laminated sheet. This coating material ensures particularly effective surface protection. A multiplicity of materials have been described which are suitable as transfer paint; preferred paint systems here are acrylic resin-based paints and polyurethane paints, more particularly those having blocked isocyanate groups. Specified by way of example are formulas which comprise branched hydroxyl-containing polyesters (Desmophen 690 from Bayer AG) and polyfunctional aliphatic isocyanate (Desmodur N from Bayer AG).

Document DE 103 18 542 A1 discloses a method for producing sheetlike materials, such as foils, sheets, and the like, that are provided with a protective layer comprising a paint. The paint is applied to a backing material and thereafter is at least partly cured. The paint used comprises radically and/or ionically polymerizable substances, and the paint applied to the backing material is at least partly cured by radical and/or ionic polymerization. The backing material provided in this way with the paint is joined by the paint side to the sheetlike material, after which the backing material is peeled off. According to one working example, a mixture of urethane acrylate, urethane acrylate with reactive isocyanate groups, and OH-functional acrylate, in stoichiometric relation to the free isocyanate groups of the additively reacting urethane acrylate fraction, and also solvent and a photoinitiator, is applied to a polypropylene foil. The solvent is evaporated at about 100° C., and the film is cured under UV light. A film of adhesion primer is applied to the film thus obtained. The resulting transfer material is compressed in a pressing operation at 140° C. and 30 MPa for ten minutes in conjunction with the following construction: metal pressing plate, transfer foil with transfer layer facing the resin-impregnated paper, 20 sheets of melamine resin-impregnated paper, transfer foil with transfer layer to the resin-impregnated paper, metal pressing plate. After the pressing operation has been ended, the two transfer foils are removed from the product. In this way it is possible to produce a HPL material whose surface has taken on the gloss or mattness of the backing foil, the material having a high scratch resistance and abrasivity and affording outstanding weathering protection.

Document DE 10 2007 040 376 A1 relates to a paint, a flexible laminate with a backing and a paint film applied thereon, and the use of this laminate. The paint—besides photoinitiators and additives—consists of a mixture of three components: a solid, double-bond-containing polyol binder (A); a solid, NCO-group-containing urethane acrylate binder (B); and a solid urethane acrylate binder (C). According to one example, a paint composition of this kind is applied to a PET foil 100 µm thick. The laminate thus formed is first dried at room temperature and then cured in an oven at 100° C. The resulting transfer laminate is placed under gentle pressure by its paint side onto an aluminum profile provided beforehand with a thin PU adhesive layer. After UV curing with a cold-cathode Hg lamp (1000 to 7000 mJ/cm$^2$), PET foil was readily peelable from the now painted aluminum profile.

With the aid of the dry paint film technology presented by Karl Worwag Lack- and Farbenfabrik GmbH & Co. KG, 70435 Stuttgart, DE, and presented at the JOT "Wet Industrial Coating" conference on Nov. 13 and 14, 2012 in Stuttgart, DE, a "topcoat foil" and a "transfer paint" were disclosed and provided in marketable form. The "decorative paint foil" consists of a backing foil, a universally pigmentable basecoat, and a highly flexible clearcoat cured using UV radiation. Application is accomplished by profile lamination, with the backing foil being adhered using PUR adhesive onto the profile of plastic windows.

The "transfer paint" consists of a backing foil having release properties, applied on which there is a thermoactive, water-based, universally pigmentable adhesion layer, on which there is located a fully cured clearcoat film, which is covered in turn with a protective foil (transfer foil). The "transfer paint" product is supplied in roll form, with a web width of 600 mm and a web length of 700 m, for example. From a web of this kind, the user will cut or punch the blank required for the coating of a particular component. For application, first of all the backing foil is peeled off; subsequently, the adhesion layer is laminated directly onto a hot PVC melt which has been provided by extrusion coating on a progressively moving aluminum profile. Provided in this way are roof trim strips (water deflectors) for passenger automobiles (Mercedes-Benz A, B, and C Class from Daimler AG, 70327 Stuttgart, DE) which are to have a class A surface. This technology is also addressed in document DE 10 2007 058 714 A1. "Transfer paint" refers here not to a particular paint composition, but rather to a four-layer, web-form product for the automobile industry.

Document DE 103 15 582 A1 discloses a method and a device for producing articles having a decorative surface, more particularly trim parts with a three-dimensional contour that can be inserted in the interior of a motor vehicle. The surface of the article is coated with an extremely uniform coating of a thermoplastic polymer, which is cured; preference is given to applying polyester that softens between 100 and 180° C. The polymer layer thus formed has a decorative representation applied to it by thermal transfer printing. Provided for this purpose is a transfer paper which is printed with sublimation dye and that is pressed onto the article with the aid of a heatable pressing die. The sublimation dye is to have a sublimation temperature of 100 to 140° C., and the printed image is transferred at a temperature of 160° C. or at temperatures between 180 and 200° C. to the polymer layer, which at that point has already softened.

Document DE 101 54 732 A1 relates to color decoration transfer systems and also to a method for color decoration using such color decoration transfer systems. The color decoration transfer system comprises at least one layer sequence of
(a) a transferable color decoration layer based on printing inks without adhesion promoters, and printed on
(b) a polymeric foil.
Polymeric foils contemplated include, in particular, polyolefin or polyamide foils, which can have a layer thickness, preferably, of 0.3 to 250 µm. This polymeric foil does not have any release properties for promoting detachment of the decorative layer. The printing of the foil (b) with the color decoration (a) may be carried out by customary printing processes, preferably with the aid of gravure or flexographic printing on known printing machines. Printing inks suitable for printing are all customary inks, provided they contain no adhesion promoter components. These printing inks may, however, include binders, in this case preferably polymers based on chlorinated or fluorinated, unsaturated olefins, more preferably based on polyvinyl chloride.

A color decoration transfer system of this kind can be used to decorate sheetlike, i.e., two-dimensional, and also three-dimensional substrates, in each case of wood, woodbase materials, plastics of any of a very wide variety of kinds, and also of glass or ceramic or metals. On transfer of the color decoration layer (a), heat and/or pressure may be applied; temperatures of at least 80° C. ought preferably to be achieved. Following the transfer operation, the polymeric foil (b) is removed, by peeling, for example. Also proposed is the application, before the transfer operation, to the color decoration layer (a) or to the substrate, of a paint layer, a primer layer, or an adhesive layer, the partial crosslinking of this paint layer, and the curing of this paint layer or drying of this adhesive layer after the transfer of the color decoration layer (a) to the substrate and after the removal of the polymeric foil (b). Transfer of the color decoration layer (a) may be carried out by means of a membrane press, of the kind described in document EP 1 000 731 A1. After the transfer, a clearcoat film may be applied to the transferred decorative layer (a), and may be cured in a customary way.

Document EP 1 000 731 A1 relates to a device for applying a decoration to a workpiece. The decoration, in particular a color decoration, is located on a polymeric foil having release properties. The backing foil with the adhering color decoration is pressed by the device, by its decoration side, against the workpiece, and the decorative color layer or layers are transferred to the workpiece or substrate by peeling, like a decal. Accordingly, this or these color decoration layers are detached from the backing foil without destruction, in the form of a preformed, single-layer or multilayer paint skin, and are transferred, in the form of the coherent, preformed paint skin, onto the workpiece. The device utilized for the transfer has:
a liquid container with a liquid which can be placed under pressure;
an elastic membrane on this liquid;
a device for generating hydraulic pressure within this liquid; and
a plate which is held stationary, arranged above and at a distance from the membrane, this plate serving as an abutment for the workpiece to be decorated, the backing foil with adhering decorative layer being able to be pressed by its decoration side onto the workpiece by means of the upwardly moving membrane.
The membrane is to be extremely elastic and stretchable, and may consist of elastic material such as, for instance, silicone or fluorinated rubber. The liquid can be heated by means of a heating installation in such a way that the membrane takes on a temperature in the range between 80 and 160° C. Using hydraulic means, a pressure of 3 to 20 bar or even up to 40 bar can be generated in the liquid. Under this hydraulic pressure, the liquid presses the membrane lying directly thereon upwards, thereby pressing the backing foil with the adhering decorative layer against the workpiece. In this way, success is achieved in pressing the decorative layer skin onto the workpiece perfectly, even in the region of profiles and edges. Following such transfer onto the workpiece, a paint film can be applied to the transferred decorative layer skin, and this paint film is subsequently cured.

The marginal region on the windshield of a motor vehicle, this region becoming gradually darker from inside to outside, is frequently produced by a process known as the MIT process or MIT printing; MIT here stands for membrane image transfer. In this case, an image consisting of pasty ink is printed onto a flexible membrane typically by means of screen printing or pad printing; preference here is given to a membrane 3 to 6 mm thick and made from selected silicone materials having a Shore A hardness of 60 to 85. Using a forming device, the membrane thus printed is placed exactly onto the three-dimensional contour of the substrate. Exertion of mechanical pressure on the forming device transfers the moist, printable ink onto the substrate; following this transfer, the moist ink can be cured; cf., for instance, documents U.S. Pat. No. 6,776,100 B1 and EP 1 851 077 B1.

A generic method of the type specified at the outset is known from document EP 1 119 455 B1. Disclosed therein is a method for producing foil-coated moldings, in which (A) the surface of a polymeric foil having a thickness of 10 to 500 µm is overpainted with at least one paint film;

(B) the paint film is partially cured;
(C) the coated foil thus produced is laminated onto a substrate, the paint film being adhesion promoter for the substrate coating;
(D) the paint is fully cured; and
(E) moldings are produced from the substrate thus coated.
(F) substrates contemplated are vehicle bodies, here preferably automobile bodies, and also household appliances, here preferably refrigerators, washing machines, and dishwashers.
(G) the polymeric film may be peelable from the coated substrate.

According to one working example, oriented or unoriented polypropylene foil (either 15 μm or 50 μm layer thickness) is painted with waterborne metallic basecoat (Mauritius blue FWO2-500) and dried at room temperature for 10 minutes and at 90° C. for 10 minutes. This system, with paint film in the direction of substrate, is pressed onto metal, wood, paper, plastic (PUR), cathodic electrocoat (7628, 7042) at 180° C. for 2 to 3 minutes. Following this application, the foil can be peeled off. A very good adhesion is obtained between paint and substrate, and also a smooth, glossy paint surface.

Under these conditions, experience suggests that a high pressingpressure must be employed in order to achieve effective adhesion, typically a pressing pressure of well above 50 bar. Accordingly, the method according to EP 1 119 455 B1 for lamination requires a high plant temperature and a high pressing pressure. The methods referred to before also necessitate high pressing pressure and high temperature for lamination.

OBJECT OF THE PRESENT INVENTION

Proceeding on this basis, the object of the present invention is to specify a generic method of the stated kind (in accordance with EP 1 119 455 B1) wherein the lamination of the solid, pigmented, and partially cured decorative layer to the substrate can be carried out under substantially milder conditions, and, nevertheless, effective adhesion is obtained between decorative element and substrate.

For the decoration, ornamentation and/or individualization of a substrate, it would be easy to stick on a decal or a decorative adhesive sheet. The outcome is often not very professional in its effect, and its durability is limited, especially under the action of outside world influences. It would be more desirable to integrate the application of the decorative element into the commercial or industrial painting operation in order thereby to obtain a more high-grade product, in which the additional decorative element is integrated into the completed paint film and is perceived as in integral component of that paint film. The method is to be able to be employed, for example, without costly and inconvenient refitting of existing units, in the OEM finishing of vehicles at the premises of the vehicle manufacturer, or in subsequent painting in the commercial paint shop.

According to a further objective of the present invention, the intention is to provide a simply constructed and easily operated device for such transfer lamination.

Lastly, the present invention encompasses the painted products which are produced by the method of the invention for transfer lamination and which have a completed paint film on which an additional decorative element is perceived as an integral component of that paint film.

INVENTIVE ACHIEVEMENT OF THE ABOVE-STATED OBJECT

Starting from a method for transfer lamination in which a transfer laminate, comprising a backing foil with an adhering decorative element having a solid, pigmented, partially cured decorative layer, is laminated by its decoration side onto a substrate, and finally the backing foil is peeled off and removed, the inventive achievement of the above object is characterized in that a substrate is provided, having a temperature in the range between 50 and 70° C., to which an overpaintable coating has been applied in the course of a conventional painting operation, the last-applied paint film of said coating being still moist and tacky after its interim drying;

the transfer laminate is laminated onto this still moist and tacky paint film on the substrate; and at least the region of the transfer laminate that comprises the decorative element is pressed onto the substrate coating for 40 to 240 sec over its full area under a pressure of 0.2 to 5.0 bar, more particularly under a pressure of 0.4 to 5.0 bar; and toward the end of this pressing phase, the backing foil is cooled rapidly to a temperature in the range from 5 to 20° C. and is thereafter removed from the decorative layer and, optionally, substrate coating, the decorative element remaining on the substrate coating; and the substrate coating with the transferred decorative layer is cured completely.

With preference the transfer laminate—even before transfer onto the paint film on the substrate—can be heated to a temperature in the range from 60 to 95° C. and laminated with this temperature onto the still moist and tacky paint film on the substrate.

Under these conditions, effective adhesion is obtained between the decorative layer and the substrate coating, and the backing foil can be separated without residue from the transferred decorative element and removed from the substrate coating without traces of the decorative layer remaining on the backing foil. The decorative element is transferred without damage. The overpaintable substrate coating is applied by means of a conventional painting operation on the substrate, and only a brief intervention into the conventional painting operation is needed for the painting of the substrate, meaning that a completed paint film can be produced on the substrate, at which the decorative element is perceived as an integral component of this paint film.

In the method of the invention for transfer lamination, a decorative layer located on the backing foil is parted fully and without destruction from the backing foil and is transferred fully and without destruction, in the form of a skin, layer or sheet onto the paint film on the substrate. Within the field under consideration here, the art has so far not developed a uniform, generally accepted terminology. As the documents cited above as prior art, and other documents, reveal, different terms, such as transfer laminate, laminate, transfer foil, laminating foil, dry-paint film, decorative ply, decorative layer, transfer paint, and the like, are used in order to denote identical or similar things. The decorative layer provided in accordance with the invention is transferred fully and without destruction onto the paint film on the substrate and in view of the correspondence of function could also be referred to as a transfer paint film or transfer paint. Similarly, the transfer laminate provided in accordance with the invention, namely the backing sheet coated with decorative layer or transfer paint, could on the basis of the correspondence of function also be referred to as dry paint film or transfer foil.

Further provided by the present invention is a device for transfer lamination of a coated substrate under the method conditions of the invention as specified above.

This device forms an applicator which maintains the transfer laminate at a small distance from the substrate surface under treatment and that comprises at least:
- a first flexible membrane and, at a distance from it, a second, parallel-aligned flexible membrane, which are both clamped in along their periphery in a pressuretight manner on a common frame in such a way as to create an intermediate space bounded by the frame and by the two membranes;
- this frame is provided with inflow means and outflow means for conditionable water, in order for this intermediate space to be filled completely with a rapidly exchangeable water layer;
- the second flexible membrane bounds a chamber to which a fluid pressure medium can be applied;
- and overall the arrangement and embodiment actualized is such
- that gradual introduction of the fluid pressure medium in the chamber moves the second flexible membrane, the water layer, and the first flexible membrane in the manner of a balloon toward the substrate surface for treatment, in order to place and to press at least the region of the transfer laminate that is provided with the decorative element against the substrate coating without bubbles by means of the first flexible membrane movable accordingly.

"Movement in the manner of a balloon" is understood here to mean that in the case of a balloonlike movement of this kind, a limited contact region between transfer laminate and substrate coating is created first of all, and then is gradually extended to the entire transfer laminate region envisaged for the transfer of the decorative element.

In the intermediate space, a water layer is formed. The water supplied initially may be warm water at room temperature or may have a moderately elevated temperature, 30 to 35° C. for example. The decorative layer placed onto the freshly produced, still moist and tacky paint film on the hot substrate is not to be cooled prematurely, but is instead to be able, initially, to activate its adhesion-promoting properties, which can be activated by heating in this specific environment, before the pressing phase is ended and the backing foil is rapidly cooled.

If the transfer laminate is to be heated to a higher temperature prior to transfer onto the paint film on the substrate, a flexible layer of hot water is formed and enclosed in the intermediate space, and rapidly heats the first flexible membrane and, following its initial movement, the transfer laminate lying against this first flexible membrane, to the pressing temperature. Introduction of the fluid pressure medium into the chamber builds up and maintains the pressing pressure. Compressed air can be used with preference as fluid pressure medium. By introduction of cold water into the intermediate space, the backing foil is rapidly cooled to the peeling temperature, while the pressing pressure is maintained. All conditions necessary for the transfer lamination of the invention can be realized by means of a simply constructed and easily operated device.

The present invention further encompasses the painted products produced by the method of the invention for transfer lamination, these products having a completed paint film on which an additional decorative element is perceived as an integral component of this paint film.

ADVANTAGEOUS EMBODIMENTS AND DEVELOPMENTS OF THE PRESENT INVENTION

Substrates contemplated include all paintable articles, especially workpieces of metal and metal sheet, and also moldings of plastic, of fiber-reinforced plastic, and of composite materials, and, furthermore, furniture items and furniture components. The substrate surface to be treated may have a planar or three-dimensional configuration. Particularly exacting requirements are imposed on the quality of vehicle finishes; without being confined thereto or without intending any such restriction, the invention is elucidated below in detail in connection with the painting of an automobile hood.

The overpaintable coating on the substrate can be produced according to a conventional painting operation, using commercially available paints adapted to the substrate; suitable paints are known to the skilled person; reference may be made to the technical literature, as for example to BASF HANDBUCH Lackiertechnik, from Goldschmidt & Streitberger, published by Vincentz Verlag, 30062 Hanover, DE, 2002. The overpaintable substrate coating can be produced using thermosetting and radiation-curing paints; highly suitable are pigmented waterborne basecoats, which are used with preference.

Paints comprise binder components, binders, crosslinking agents, and optionally curing agents and initiators, containing reactive groups attuned mutually to one another. In the course of film formation, these groups react with one another and form networks three-dimensionally crosslinked with one another, until, eventually, complete crosslinking or curing of the paint film is achieved. The crosslinking process can be initiated and controlled, by solvent removal, heating, and—optionally—radiation curing, for example. An "overpaintable coating" is a coating generated by application of a paint, the crosslinking of the coating having been initiated but not yet concluded. The "overpaintable coating" comprises reaction-ready binder components, binders and/or crosslinking agents which react with one another, and which are able to react with appropriate groups in a subsequently applied coating. A substrate having a partially cured paint film can be stored; the state of the "overpaintable coating" can be brought about by initiation and continuation of the crosslinking reaction. Where paints are used that have active binder components, binders and/or crosslinking agents, based for example on urethane-modified or urethane-forming acrylate systems containing reactive groups, a crosslinking reaction of this kind may be initiated simply by moderate heating to temperatures in the range from 60 to 80° C.

The pigmented decorative layer on the decorative element is to be perceptible against the background of the substrate coating. Preferably, therefore, the decorative element is laminated onto a pigmented basecoat film or top film on the substrate, whose pigmentation differs from the decorative layer color. Subsequently there may be overpainting with clearcoat.

According to one advantageous embodiment of the invention, the overpaintable coating on the substrate is a pigmented basecoat film or top film whose crosslinking has been initiated but not yet concluded.

Within the context of the invention it has been recognized that the backing foil can be laminated onto a freshly produced, still warm and tacky basecoat film and then, after sufficiently rapid and deep cooling, or "quenching", can be removed again without adversely affecting this basecoat film. In the method of the invention, the transfer laminate is laminated onto a freshly produced, still warm, moist and tacky basecoat film. A basecoat film of this kind which is still warm, moist, and tacky is obtained after the interim drying ("flash off") of the last-applied basecoat film, the substrate typically still having a temperature in the range between 50 and 70° C. Thereafter it is possible to apply a one-component or two-component clearcoat, and finally the entire coat system is completely crosslinked and cured, typically by heating at 130 to 150° C. In the course of this heating, the transferred decorative layer is also completely cured.

Accordingly, in the context of the present invention, provision is made for the transfer laminate, in the course of a conventional painting operation of the substrate, to be laminated onto the paint film applied last in the course of that painting operation, more particularly the basecoat film, after the interim drying thereof, while this (basecoat) paint film is still moist and tacky, and for the substrate to have a temperature in the range between 50 and 70° C.

The backing foil is to be flexible, so that it can be placed even onto three-dimensionally configured substrate surfaces without creases and without bubbles; furthermore, the backing film provided with the decorative element is to be able to be wound up in a roll for purposes of storage and transport. The decorative layer is to adhere sufficiently to the backing foil, even after partial curing and crosslinking of the decorative layer. On the other hand, after the transfer lamination of the invention, the adhesion between the decorative layer and the overpaintable substrate coating must be greater than the adhesion between the decorative layer and the "quenched" backing foil, thus allowing the backing foil to be removed without carrying particles of paint film with it. Backing films contemplated include, in particular, impregnated papers, so-called paper foils, metal foils, and polymeric foils. Highly suitable, for example, are customary aluminum foils, preferably having an anodically passivated Al surface, the decorative layer being applied to this passivated Al surface. Polymeric films contemplated include cast or calendered foils of relatively inert thermoplastic polymers, such as polyolefins, halogenated polyolefins, polyamides, and aromatic polyesters, and also films composed of mixtures and/or blends of these materials. Such polymeric films may preferably have a layer thickness of 10 to 250 µm; even more preferred are polymeric films of these kinds having a layer thickness of 20 to 120 µm. Very good results have been obtained, for example, with a biaxially oriented polypropylene foil 40 µm thick.

According to a further standpoint of the present invention, preference is given to using, as backing foil, a polymeric foil which consists of polyolefin, halogenated polyolefin, polyamide, aromatic polyester, and also of mixtures and/or of blends of these materials, and which has a layer thickness of 10 to 250 µm.

The application of a release agent between backing foil and decorative layer is less desirable, since residues of release agent remaining on the decorative layer after the detachment of the backing foil might adversely affect the subsequent overpainting with a clearcoat; even in very small concentration, surfactants and the like disrupt the application of liquid paint and its flow behavior.

The decorative element has a decorative layer, adheres to the backing foil, and can be transferred from that foil, under the conditions envisaged in accordance with the invention, without destruction onto the overpaintable substrate coating. The decorative element may be of one-part or multipart construction; a multipart decorative element may consist, for example, of a plurality of letters, separated from one another, of a word and/or digits of a number; also contemplated here is a combination of a plurality of stripes and bands at a distance from one another. Each individual decorative element part may have any desired design or outline; contemplated here, for example, are customary shapes, such as, for instance, sun, moon, star, circular disk, lightning flash, arrow, and other symbols and motifs.

The decorative layer is pigmented; chromatic and achromatic pigments are contemplated here; using achromatic pigments, for example, a white or gray or silver-color or black sequence of letters and/or digits may be reproduced, standing out from a contrastingly colored basecoat film on the substrate. Optionally it is possible additionally to provide platelet-shaped effect pigments, interference pigments, and pearlescent pigments, which evoke a metallic effect and also viewing-angle-dependent shifts in shade and/or differences in lightness.

The decorative layer may be single-color (including "achromatic colors") and may be constructed of one or more paint films. The application of this or these paint film or films to the backing foil may take place in particular by spraying, brushing, rolling, or knifecoating. In the case of a multipart decorative element, the individual decorative element parts may be applied already in their completed form, using stencils or other masking agents; alternatively, a full-area coating may be applied, from which the individual decorative element parts are cut out (under program control or according to template); the regions of coating which are no longer desired are removed, with the aid of laser sputtering, for example.

The decorative layer may alternative reproduce a multicolor image or another multicolor representation which has been applied to the backing foil by means of screen printing or offset printing, in this case in particular by a combined gravure/offset process. The printing ink film thus formed may have been overpainted with a clearcoat film which protects and stabilizes the printing ink film and supports its full transfer onto the substrate coating.

It may be recalled that the decorative element, following its transfer onto the substrate coating, is perceived as a mirror image. The decorative element should therefore be applied to the backing foil in its mirror image form, allowing this decorative element to be perceived in the intended original form following its transfer onto the substrate coating.

In order to produce the decorative layer, a paint formulation is applied to the backing foil, flashed off, and dried. A highly suitable paint formulation is a liquid paint formulation which can be sprayed on or spread on using the doctor blade. In many cases, just 1 minute of flashing and 1 minute of drying by means of hot air and IR radiation is sufficient to obtain a decorative layer which at room temperature is dry, nontacky, flexible, and storable. Further moderate heating of the decorative layer, preferably to a temperature in the range from 60 to 95° C., is to be capable of activating its adhesion-promoting properties. For the formation of the decorative layer, preference can be given to selecting a paint formulation of this kind, so that the adhesion-promoting properties of the decorative layer are activated during the step of placement onto the substrate which is at a temperature in the range from 50 to 70° C. Corresponding paint formulations based on acrylic resins, on polyester resins, and on polyurethane resins, and also based on mixtures and blends of these resins, including binders and binder components based on polyester urethanes and urethane acrylates, are known to the skilled person and are available commercially. The paint formulation forming the decorative layer is to be compatible with the freshly applied paint film presented on the substrate. Identical or similar paint systems are preferably used for both paint films. The pigmented basecoat film on a motor vehicle is frequently produced from paint formulations based on polyurethane dispersions in dispersion or solution in water. In the context of the present invention, in this case, a water-based polyurethane paint system is also preferably used for forming the decorative layer.

Furthermore, the decorative layer may be produced preferably from thermosetting paint formulations based on chemically reactive acrylate resins which contain functional groups, such as, for instance, hydroxyl groups, carboxyl groups, amino groups, and amido groups. Crosslinking may take place with formation of urethane, as for instance by self-crosslinking of the binder component or components or by external crosslinking through isocyanate curing agents. On this basis, highly reactive thermosetting paint formulations can be provided whose crosslinking reaction can be achieved simply by moderate heating to a temperature in the range from 60 to 80° C. Paint formulations of these kinds are known to the skilled person and can be acquired commercially in the trade, as for example from KARL WÖRWAG Lack- and Farbenfabrik GmbH & Co. KG, 70435 Stuttgart, DE.

Consequently, according to a further advantageous embodiment of the present invention, provision is preferably made for the decorative layer to be obtainable from thermosetting paint formulations based on chemically reactive acrylate resins whose urethane-forming crosslinking reaction can be initiated simply by moderate heating to a temperature in the range from 60 to 80° C.

The decorative layer applied to the backing foil is partially cured. This can be achieved typically by drying. After the partial crosslinking and curing, the decorative layer is to adhere sufficiently to the backing foil and still to be sufficiently elastic for the decorative layer as well to undergo the winding-up of the backing foil into a roll, without suffering damage.

Preference is given to a decorative layer having a dry layer thickness of 18 to 30 μm. A decorative layer of this kind can be readily overpainted with a clearcoat film. The decorative layer does not add substantial bulk, and a completed paint film can be produced on which the decorative element is perceived as integrated into the paint film.

The transfer laminate is heated to a temperature at which the adhesion-promoting properties of the decorative layer that can be activated by heating are activated. In many cases it is enough for this purpose for the layer to be placed onto the freshly produced paint film, located on the substrate, which is at a temperature in the range from 60 to 80° C.; this is particularly the case when this substrate has an inherent high heat capacity, such as, for instance, the steel panel of an automobile body that is still hot after the preceding interim drying. In such a case there is no need for any additional heating of the transfer laminate before placement onto the freshly produced, and still moist and tacky, paint film on the still-hot substrate.

Alternatively, prior to its placement onto the hot substrate, the transfer laminate can be heated to a temperature in the range from 60 to 95° C. and placed at this temperature onto the overpaintable coating on the substrate. This heating puts the decorative layer on the backing foil into an overpaintable state. Where the decorative layer has a highly reactive thermosetting paint system, heating to a temperature in the range from 60 to 80° C. may be sufficient, and is more preferred. Under these conditions, the pressing of the overpaintable decorative layer onto the overpaintable substrate coating creates a strong bond between the reactive paint films.

According to a further advantageous embodiment of the present invention, consequently, provision is preferably made for the transfer laminate to be heated to a temperature in the range from 60 to 95° C. and laminated at this temperature onto the still moist and tacky paint film on the substrate.

The transfer laminate with the overpaintable decorative layer is pressed over the full area onto the overpaintable substrate coating under a pressure of 0.2 to 5.0 bar, more particularly under a pressure of 0.4 to 5.0 bar. A gradual buildup of pressure is envisaged, leading to a balloonlike curving of the first flexible membrane and of the transfer laminate lying against it. The transfer laminate can be placed without bubbles onto the substrate coating. The pressing pressure that is actually applied is also selected in dependence on the substrate and its stability. For example, according to the method of the invention, a relatively extensive decorative element (with an area, for example, of greater than 1000 $cm^2$) can be applied to a comparatively extensive automobile bodywork part, such as an engine hood, a door, a roof, a trunk cover, or a rear gate, for instance, which has been provided with a freshly produced paint film comprising a pigmented waterborne basecoat material, this film being still moist and tacky after brief interim drying. In this case, typically, a pressing pressure of 0.2 to 0.8 bar, and preferably a pressing pressure of 0.5 to 0.8 bar, is employed, in order to prevent deformation of the automobile bodywork part. In this way, for example, the color coat of the roof finish of a MINI® can be applied; on the MINI®, the roof is often a different color than the remainder of the bodywork. (MINI® is a registered trademark of Bayerische Motorenwerke AG, 80809 Munich, DE).

According to a further preferred embodiment of the invention it is provided that
  the substrate is a comparatively extensive automotive bodywork part;
  the overpaintable substrate coating is a freshly produced paint film, still moist and tacky after brief interim drying, composed of pigmented waterborne basecoat material; and
  the transfer laminate provided with a heated and thus overpaintable decorative layer is pressed onto this substrate coating under a pressure of 0.5 to 0.8 bar.

In this way, using simple means and measures, a multicolor paint finish can be obtained on a motor vehicle by means of transfer paint. This multicoloredness can be achieved without the costly and inconvenient taping off and masking of those areas that are not supposed to come into contact with the second, or even any third or further, color. For the application of the second color to particular defined area sections, there is no need for a second pass through the painting line and/or for duplication of particular painting cycles. Nor is there any need for additional drying steps, thereby improving energy efficiency. Design diversity on the passenger automobile can be increased, since individualization through two or more different colors is made possible.

A high pressing pressure of 4.0 to 5.0 bar is employed preferably in the case of small metal workpiece components, such as for profiles and trim strips, for example.

In the course of the pressing phase, along the interface between overpaintable substrate coating and overpaintable decorative layer, there is a reaction between reactive groups and components in both coats/layers. It is necessary to produce a bond with strong adhesion, exceeding the adhesion between the decorative layer and the "quenched" backing foil, allowing the backing foil to be easily separated and peeled away from the decorative layer and, where appropriate, from the substrate coating after rapid cooling or "quenching". In the case of highly reactive thermosetting paint systems in both coats/layers, a relatively short timespan for the pressing phase may be sufficient; in such a case, a pressing phase of 40 to 180 sec is more preferred, and a pressing phase of 40 to 120 sec is even further preferred. The shorter the pressing phase, the shorter the selectable break in the ongoing conventional painting operation.

Rapid cooling of the backing sheet from the placement temperature to a temperature in the range from 5 to 20° C. refers here to cooling within a timespan of less than 30 sec, more preferably within a timespan of less than 20 sec, and even more preferably within a timespan of less than 10 sec. This can be achieved by rapid replacement of the warm or hot water layer with a cold water layer, and continuous rinsing of the intermediate space between the two flexible membranes with cold water. Mains water can typically be used as cold water. The faster the backing foil is cooled or quenched, the easier it is to separate the backing foil from the decorative layer. Owing to the greater heat capacity of the substrate, the decorative layer that is adhering to the substrate coating and hence is lying against the substrate does not cool down so quickly. The resulting temperature difference between the backing foil and substrate/substrate coating/decorative layer creates mechanical stresses, which promote the detachment and removal of the backing foil.

According to a further preferred embodiment of the invention, therefore, provision is made for the backing foil, lying with its placement temperature against the substrate coating, to be cooled within a timespan of less than 30 sec to a temperature of less than 20° C., during which the placement pressure is maintained.

Following removal of the backing foil, the substrate coating and the decorative layer transferred onto the substrate coating are cured completely; this may take place immediately or at a later point in time. For the curing, there may be single-stage or multistage heating, typically to a temperature above 100° C. Preferably a full-area clearcoat film is applied additionally to the substrate coating provided with the decorative layer, and the complete curing of the substrate coating and of the decorative layer takes place as part of the drying of this clearcoat film, typically at temperatures between 130 and 150° C. It is possible to obtain a painted substrate which is provided with a complete paint film, on which the additional decorative element is perceived as an integral component of this paint film.

According to a further preferred embodiment of the invention, provision is made for the substrate coating provided with the transferred decorative layer—optionally following additional application of a clearcoat film—to be cured completely by drying at a temperature between 130 and 150° C.

DETAILED DESCRIPTION WITH REFERENCE TO DRAWINGS AND EXAMPLE

The device of the invention for transfer lamination is elucidated below with reference to a preferred embodiment, referring to the drawings; the latter show as FIG. 1 a schematic plan view of the applicator of the transfer lamination device;

FIG. 2 a schematic side view of the applicator and its holding apparatus;

FIGS. 3 and 4, each on the basis of a schematic side view of the applicator, an increasing balloonlike outward curvature of the first flexible membrane and of the transfer laminate; and FIG. 5, with reference to an inclined image, the use of an applicator produced.

FIG. 2 shows an applicator 10 which is held by a holding apparatus 1. The holding device 1 is equipped with a lifting mechanism 2, indicated only schematically, and with a pivoting mechanism 3 and a rotating mechanism 4, which are used to align the applicator 10 in any desired direction in space, and can also be moved toward and away from a substrate 40 (cf. FIGS. 3 and 4).

The applicator 10 has a closed frame 12, rectangular in the present case, which may be constructed from a plurality of light metal frame segments of equal area. Inserted into this frame 12 are a first flexible membrane 20 and, at a distance from it, a second, parallel-aligned flexible membrane 22. Each membrane 20, 22 may consist of natural rubber or of a similarly elastic material, such as of a silicone material, for instance. In the case of the applicator 10 described here, each flexible membrane 20, 22 has an area of 40×60 cm and a layer thickness of 2 mm; the distance between the two membranes 20 and 22 is 10 mm. A pressuretight intermediate space 25, bounded by the two membranes 20 and 22 and by the frame 12, is created, and can be flushed or filled with water. Mounted in a pressuretight manner at a distance from the second flexible membrane 22, on the frame 12, is a full-area plate 29, usually of light alloy, so that a pressuretight chamber 30 is created, bounded by the second flexible membrane 22, the frame 12, and the plate 29, and can be subjected to the action of a fluid pressure medium, in this case more particularly compressed air. The compressed air is introduced into the chamber 30 from a compressed air source 31, which is indicated only schematically; by means of the restriction valve 33, a gradual increase of pressure in the chamber can be regulated 30, such as to an overpressure of about 0.7 bar within a timespan of 3 to 5 sec.

As indicated schematically with FIG. 1, inflow means 13 are mounted on the frame 12, and allow water to be introduced into the intermediate space 25; moderately warm water from a warm water source or hot water from a hot water source can be supplied via the line 14; cold water from a cold water source, mains water for example, can be supplied via the line 16. Both lines 14, 16 are attached to an inflow valve 15, which releases either the hot water flow or the cold water flow, or which blocks flow completely.

Additionally mounted on the frame 12 are outflow means 17, allowing water to be drained off from the intermediate space 25. Assigned to these outflow means 17 is an outflow valve 18, which is able to release or block flow.

When the intermediate space 25 has initially been flushed with warm or hot water for thermal conditioning, the outflow valve 18 is actuated into its block position, after which the intermediate space 25 is filled completely with warm or hot water, and after which, as well, the inflow valve 15 is actuated into its block position. The intermediate space 25 is fully filled with warm or hot water and sealed in a pressuretight manner, so that a flexible warm or hot water layer 27 is formed and enclosed here. The introduction of compressed air into the chamber 30 brings about a movement of the second flexible membrane 22, which via the flexible warm or hot water layer 27 produces a movement, of the same extent and of the same direction, on the part of the first flexible membrane 20. The first flexible membrane 20 has taken on a temperature close to the temperature of the warm or hot water layer 27, and when placed on the transfer laminate 35, will heat it almost to the warm or hot water temperature.

Mounted on each of the opposite side transoms of the frame 12 is a flange 37, 37', with a clamping strip 38, 38' being assigned to each flange; accordingly, a transfer laminate 35 in strip form is held without creases under gentle tension. The transfer laminate 35 comprises a backing foil 36, applied on which there is a decorative element which in the present case is formed by the indicium HAWAI 2014, which is reproduced in mirror script. The indicium is located on the side of the backing foil 36 remote from the first flexible membrane 20.

The mode of operation of the applicator 10 is illustrated schematically with FIGS. 3 and 4; here, in order to achieve greater clarity, the flanges 37, 37' and clamping strips 38, 38' that hold the transfer laminate 35 have not been shown.

The use of the applicator 10 is made ready; the intermediate space 25 is filled completely with a warm or hot water layer 27; the inflow valve 15 and the outflow valve 18 are each actuated into their blocking positions; the flexible arrangement of second flexible membrane 22, enclosed warm or hot water layer 27, and first flexible membrane 20 is able to take over the function of a hot-water bag.

The applicator 10 is arranged adjacent to and at a distance from a substrate 40—in the present case, an automobile bodywork part, specifically an engine hood, which is indicated only schematically; opposite the applicator 10, the substrate 40 is firmly anchored and arranged in a stable manner; the distance between the transfer laminate 35 and the substrate surface 42 for coating is about 7 cm. Compressed air is introduced slowly into the chamber 30, in order to bring about a gradual increase in pressure; over the course of 5 sec, an overpressure of 0.7 bar is attained. The second flexible membrane 22, the flexible water layer 27, and the first flexible membrane 20 are moved, together and in the same direction, toward the initially linearly stretched transfer laminate 35. The first flexible membrane 20 contacts the transfer laminate 35 and takes it with it on further movement. The gradual pressure increase produces a balloonlike movement, in which first a limited central region of the transfer laminate 35 contacts the substrate surface 42.

Finally, on further movement, at least the entire region of the transfer laminate 35 that is provided with the decorative element (i.e., with indicium HAWAI 2014) is placed onto the substrate surface 42; bubble-free placement can be achieved. The complete placement pressure of 0.7 bar is maintained for about 120 sec. As a consequence of the placement, reactive groups in the warm decorative layer react with reactive groups in the warm overpaintable substrate coating. Effective adhesion of the decorative element on the substrate coating is obtained.

Subsequently, the inflow valve 15 is actuated for flow of cold water, and the outflow valve 18 is activated for flow; the warm or hot water in the intermediate space 25 is rapidly replaced by cold water; a cold water flow is permitted for some time. When the backing foil 36 has cooled to a temperature of less than 20° C., the applicator 10 is moved away from the substrate 40; the backing foil 36 held on the applicator 10 is removed from the coated substrate surface. The indicium is located completely and without damage on the substrate coating.

FIG. 5 shows the use of an applicator 10 produced. The water inflow means 13 and the water outflow means 17 are indicated only schematically.

EXAMPLE

A spray gun is used to apply waterborne basecoat material (Mauritius blue) in a film thickness of 12 to 14 µm to a primed OEM engine hood (of an AUDI A1). Following application, the film is flashed off at room temperature for 2 minutes and subsequently dried at 60° C. for 6 minutes within a booth equipped with IR emitters. After this the freshly produced basecoat film is still moist (water content about 10%) and tacky. The hood thus painted is arranged in a fixed location, with the hood top aligned substantially horizontally and with the two hood flanks aligned substantially vertically.

In addition to this fixed-location, freshly painted engine hood, an applicator described above with reference to FIGS. 1 to 5 is arranged in a fixed location but in such a way that it can be moved. Under gentle tension, the two holding flanges hold a transfer laminate in strip form (length 90 cm; height 20 cm); to a 40 µm backing foil of biaxially oriented polypropylene, the silver-color indicium HAWAI 2014 is applied in mirror script; the indicium is cut out from a pigmented waterborne basecoat film (dry film thickness 22 µm) which has been applied over the full area and partly cured. The transfer laminate is arranged parallel and at a distance of about 6 cm from the left-hand flank of the hood.

The applicator is connected to a source of hot water (about 85° C.) and to a source of cold water (mains water at about 15° C.); furthermore, drainage of the water is ensured via an outflow valve. The chamber is connected via a restriction valve to a compressed air source; the overpressure in the chamber can be built up gradually—under time control.

The intermediate space between the two flexible membranes is filled completely with hot water; the inflow valve and the outflow valve are actuated into their blocking position; a flexible hot water layer is enclosed in the intermediate space. Compressed air is introduced under control into the chamber; accordingly, the second flexible membrane, the hot water layer, and the first flexible membrane are moved toward the linearly stretched transfer laminate, until the first flexible membrane is lying against the transfer laminate. Within a few seconds (=sec), the transfer laminate takes on a temperature close to the temperature of the warm or hot water.

The pressure in the chamber is raised, ascending gradually, to 0.7 bar overpressure. The first flexible membrane continues to balloon out, and with its central region first presses a central region of the transfer laminate against the hood flank. A balloonlike movement and placement of a central region of the transfer laminate on the hood flank is obtained, and is extended to the entire placement surface within a timespan of about 5 sec; the entire region of the transfer laminate, including the indicium, is placed without bubbles onto the hood flank. This region of the transfer laminate is held, with its placement temperature, for about 120 sec, during which the placement pressure of 0.7 bar overpressure is maintained, on the hood flank in the unit.

Subsequently, with the placement pressure maintained, there is a sudden switch from hot water supply to cold water supply; the backing foil is cooled to a temperature of less than 20° C. within a timespan of less than 30 sec. The applicator mount is then moved away from the hood; the backing foil firmly held on the applicator is detached from the hood flank, separated, and removed. There are no traces at all of Mauritius blue paint or silver-colored paint from the indicium in evidence on the detached backing foil.

Subsequently it is possible to carry out drying, leading to the complete curing of the basecoat film on the hood and of the decorative layer (of the indicium) on this basecoat film; drying at a temperature between 130 and 150° C. is highly suitable.

Alternatively, after removal of the backing foil, a clearcoat film can be applied to the still overpaintable basecoat film, including the decorative layer of the indicium, and subsequently this drying and complete curing can be carried out.

Obtained on the hood is a complete paint film which is provided, on one hood flank, with the additional indicium HAWAI 2014 in silver-colored script; this indicium causes virtually no extra bulk on the paint surface, and is perceived as an integral component of this paint film.

The invention claimed is:

1. A method for transfer lamination
in which a transfer laminate, comprising a backing foil with an adhering decorative element having a solid, pigmented, partially cured decorative layer,
is laminated by its decoration side onto a substrate, and finally the backing foil is peeled off and removed,
wherein
a substrate is provided, having a temperature of 50 to 70° C., to which an overpaintable coating has been applied in the course of a conventional painting operation, the coating comprising a paint film that has been applied last and being still moist and tacky after its interim drying;
the transfer laminate is laminated onto the still moist and tacky paint film on the substrate; and
at least the region of the transfer laminate that comprises the decorative element is pressed onto the substrate coating for 40 to 240 sec over its full area under a pressure of 0.2 to 5.0 bar, more particularly under a pressure of 0.4 to 5.0 bar; and
toward the end of the pressing phase, the backing foil is cooled rapidly to a temperature of 5 to 20° C. and is thereafter removed from the decorative layer and, optionally, substrate coating, the decorative element remaining on the substrate coating; and
the substrate coating with the transferred decorative layer is cured completely.

2. The method for transfer lamination as claimed in claim 1, wherein
the transfer laminate is heated to a temperature in the range from 60 to 95° C. and at this temperature is laminated onto the still moist and tacky paint film on the substrate.

3. The method for transfer lamination as claimed in claim 1, wherein
the overpaintable coating on the substrate is a pigmented basecoat film or top film, whose crosslinking has been initiated but not yet concluded.

4. The method for transfer lamination as claimed in claim 1, wherein
the backing foil is a polymeric foil
which consists of polyolefin, halogenated polyolefin, polyamide, or aromatic polyester, and also of mixtures and/or blends of these materials; and
the polymeric foil has a layer thickness of 10 to 250 μm.

5. The method for transfer lamination as claimed in claim 1 wherein
the decorative layer is obtainable from thermosetting paint formulations based on chemically reactive acrylate resins whose urethane-forming crosslinking reaction can be initiated even by moderate heating to a temperature of 60 to 80° C.

6. The method for transfer lamination as claimed in claim 1, wherein
the decorative layer is obtainable from thermosetting paint formulations based on chemically reactive acrylate resins whose urethane-forming crosslinking reaction can be initiated even by moderate heating to a temperature of 60 to 80° C.;
a substrate is provided, having a temperature of 50 to 70° C., to which an overpaintable coating has been applied in the course of a conventional painting operation, coating comprising a basecoat film that has been applied and being still moist and tacky after its interim drying;
the transfer laminate is heated to a temperature of 60 to 95° C. and is laminated at that temperature onto the still moist and tacky basecoat film on the substrate; and
at least the region of the transfer laminate that comprises the decorative element is pressed onto the substrate coating for 40 to 240 sec over its full area under a pressure of 0.4 to 5.0 bar; and
toward the end of the pressing phase, the backing foil is cooled rapidly to a temperature of 5 to 20° C. and is thereafter removed from the decorative layer and, optionally, substrate coating, the decorative element remaining on the substrate coating; and
the substrate coating with the transferred decorative layer is cured completely.

7. The method for transfer lamination as claimed in claim 1, wherein
the decorative layer has a dry layer thickness of 18 to 30 μm.

8. The method for transfer lamination as claimed in claim 1, wherein
the substrate is a comparatively extensive automotive bodywork part;
the overpaintable substrate coating is a freshly produced film, still moist and tacky after brief interim drying, composed of a pigmented waterborne basecoat material; and
the transfer laminate provided with the heated and overpaintable decorative layer is pressed onto the overpaintable substrate coating under a pressure of 0.5 to 0.8 bar.

9. The method for transfer lamination as claimed in claim 1, wherein
the backing foil, lying with its lay-on temperature on the substrate coating, is cooled within a timespan of less than 30 sec to a temperature of less than 20° C.

10. The method for transfer lamination as claimed in claim 1, wherein
the substrate coating provided with the transferred decorative layer—optionally after additional application of a clearcoat film—is completely cured by drying at a temperature of 130 to 150° C.

* * * * *